United States Patent [19]

Tee

[11] Patent Number: 4,550,252
[45] Date of Patent: Oct. 29, 1985

[54] APPARATUS FOR DETECTING THE THICKNESS OF SHEETS

[75] Inventor: Victor G. Tee, Havant, United Kingdom

[73] Assignee: De La Rue Systems Limited, London, England

[21] Appl. No.: 403,587

[22] PCT Filed: Nov. 7, 1981

[86] PCT No.: PCT/GB81/00237
§ 371 Date: Jul. 6, 1982
§ 102(e) Date: Jul. 6, 1982

[87] PCT Pub. No.: WO82/01698
PCT Pub. Date: May 27, 1982

[30] Foreign Application Priority Data
Nov. 7, 1980 [GB] United Kingdom ............... 8035851

[51] Int. Cl.[4] .............................................. G06M 7/00
[52] U.S. Cl. .................................. 250/223 R; 271/263
[58] Field of Search ............ 250/204, 214 RC, 223 R; 271/262, 263; 455/608; 340/657, 660, 674; 307/358, 362, 311; 328/147, 151

[56] References Cited

U.S. PATENT DOCUMENTS

3,593,989  3/1971  Crittenden .......................... 271/263
3,660,670  5/1972  Howard ....................... 250/214 RC
4,151,410  4/1979  McMillan et al. .............. 250/223 R
4,237,378  12/1980  Jones ............................... 250/223 R
4,378,109  3/1983  Takahashi et al. .................. 271/263
4,398,711  8/1983  Horst et al. .......................... 271/263

Primary Examiner—David C. Nelms
Assistant Examiner—J. Jon Brophy
Attorney, Agent, or Firm—Sughrue, Mion, Zinn, Macpeak and Seas

[57] ABSTRACT

Apparatus for detecting the presence of a single banknote or a double banknote (5) comprises a cylindrical roller (1) biased by way of a pivot arm (2) against a moving surface (6) which conveys banknotes under the roller (1). The other end of the pivot arm is connected to the core of a linear variable differential transformer (4) which is activated by an oscillator (7). The output of the L.V.D.T. (4) is proportional to the displacement of the roller (1) normal to the surface (6) and is thus indicative of the thickness of any banknotes passing under the roller. In order to compensate of mechanical and electrical drift in the thickness level corresponding to the absence of a banknote, the auto-reference circuit (9) derives first and second threshold values for single and double notes respectively by adding predetermined potentials to the reference potentials. These predetermined differentials may be controlled manually by a variable resistor (11) within a thickness control circuit (10).

10 Claims, 6 Drawing Figures

APPARATUS FOR DETECTING THE THICKNESS OF SHEETS

BACKGROUND OF THE INVENTION

This invention relates to apparatus for detecting the thickness of sheets as they are moved past the apparatus, and is especially applicable to the detection of banknotes where the thickness of two or more superimposed banknotes should be distinguished from that of a single banknote.

Machines for detecting the simultaneous passage of two banknotes where banknotes should normally pass singly are known, and one example of an optical detector is in commonly assigned British Pat. No. 1,344,986, the detector responding to the opacity of the note or notes; this is inadequate if the notes are greasy or soiled. Mechanical thickness detectors are also known using a roller whose axis is displaced by the passage of a banknote or banknotes to cause an electrical contact to be made or broken if the displacement is such as to indicate the passage of superimposed banknotes. Apparatus for gauging laminar materials, using nip rollers and a variable-reluctance transducer, is disclosed in commonly assigned British Pat. No. 1,497,181.

However, none of the machines has yet been able to compensate for long-term variations in the detecting heads and in the control circuitry which will tend to change the threshold value of the banknote thickness, i.e. the thickness at which the detector will signal the passage of a double banknote. In the case of the mechanical detector using a roller, this long-term drift could be caused by mechanical movement between the pivot of an arm attached to the axis of the roller, and the surface on which the note is placed as it is moved under the roller. This potentially degrades note thickness measurement if the output of the detector is compared against a fixed threshold level in the output stages of the control circuit. Mechanical stability of the order required for measuring banknote thicknesses, for example 0.005 cm to 0.015 cm, is difficult to achieve under reasonable manufacturing and wear rate conditions.

SUMMARY OF THE INVENTION

Apparatus according to the invention for the detection of single or multiple sheets comprises: a support on which the sheet or sheets is carried for movement in the plane of the sheets; a follower biased such that it normally abuts against the support and follows the profile of the surface of the support and the overlying sheet or sheets; a transducer responsive to the position of the follower to provide a thickness signal indicative of the linear displacement of the follower relative to the support due to the passage of the sheet or sheets; and a control circuit which compares the thickness with at least one stored threshold level signal to provide an output signal indicative of whether the detected thickness corresponds to that of a single sheet or multiple sheets; and characterized in that the control circuit includes means for repeatedly updating the or each stored threshold level signal from the thickness signal provided when there is no sheet between the support and the follower. There may be an arm for conveying the movement of the follower to the transducer. This can be a pivot arm, the follower being a cylindrical roller whose axis is attached to the end of the pivot arm. The position of the pivot point along the arm is then preferably such that small displacements of the follower are converted into larger displacements of the other end of the arm engaging with the transducer. The transducer is then ideally a linear variable differential transformer.

An alternative apparatus comprises a follower which is a cylindrical roller, the transducer being of variable reluctance and comprising a transformer whose magnetic circuit is completed by a portion of the periphery of the said follower, the thickness signal being the voltage across the transformer which depends on the degree of displacement of the follower roller towards a core of the transformer.

The control circuit preferably includes a manually adjustable level control by means of which the expected thickness of a single sheet is designated, the control circuit then deriving at least a first threshold level, for the thickness of a single sheet, from the said expected thickness and from the reference signal provided by the transducer when there is no sheet between the surface and the follower.

The control circuit preferably also derives a second threshold level for the thickness of a double sheet, and the output signal indicates the passage of a single or a double sheet. The apparatus may be more complex, and is capable of being extended so as to indicate the passage of three or more superimposed sheets, or else to indicate different types of sheets passing under the roller, the different types having different thicknesses.

BRIEF DESCRIPTION OF THE DRAWINGS

Two embodiments of the invention will now be described with reference to the accompanying drawings, in which.

DETAILED DESCRIPTION OF THE PREFERRED EMBODIMENTS

Figure 1:
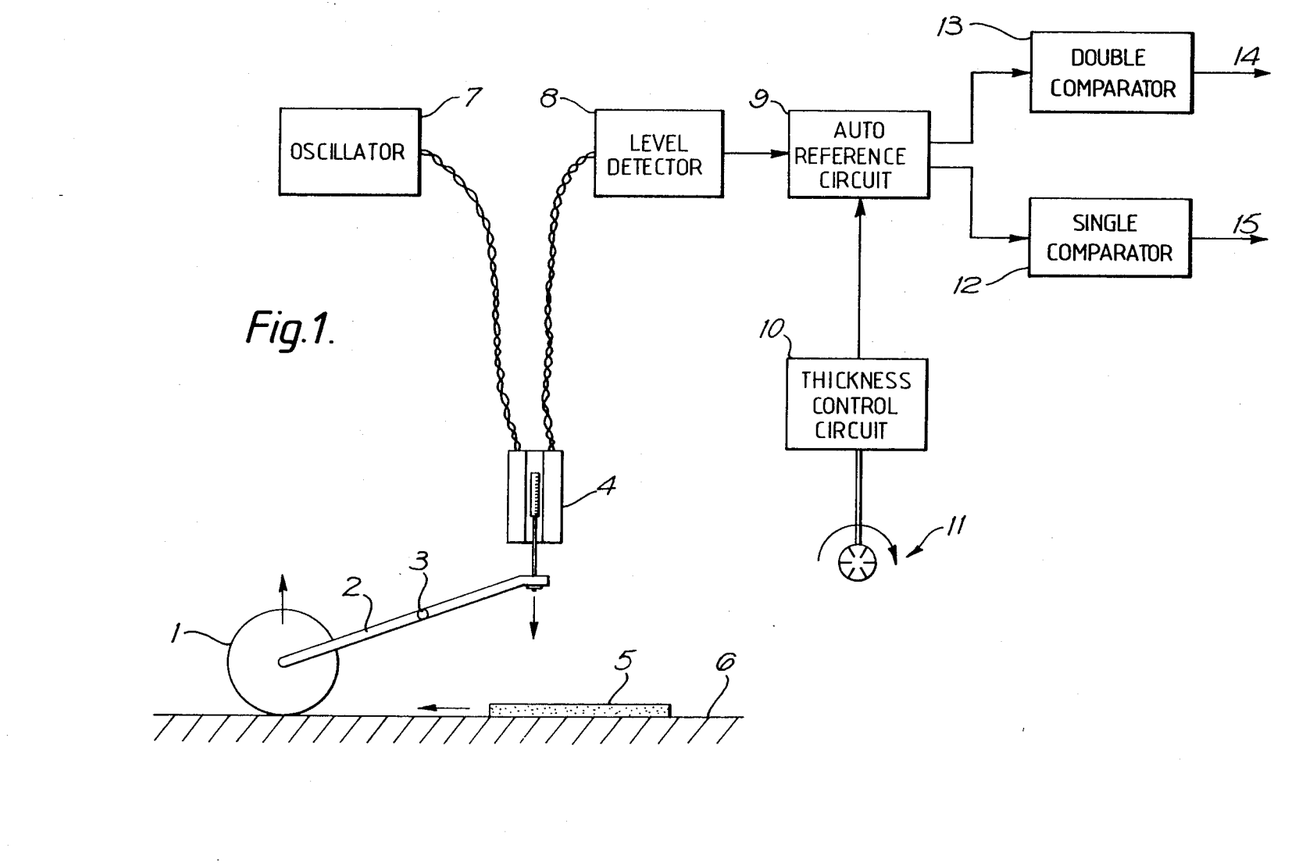
FIG. 1 illustrates diagrammatically apparatus for detecting the thickness of banknotes and an associated control circuit according to a first embodiment of the invention.

Referring first to FIG. 1, a banknote 5 is moved by a conveyor 6, whose surface also serves as a reference datum, into the nip formed between a cylindrical roller 1 and the conveyor surface. The roller 1 is attached at its axle to a pivot arm 2 which is biased in the anticlockwise direction but is free to rotate about a pivot 3. A linear transducer constituted by a linear variable differential transformer (LVDT) 4 has a movable core attached to the other end of the pivot arm and is energised by the oscillator 7. The downward displacement of the core when the roller is pushed up by the passage of the banknote under the roller is proportional to the thickness of the banknote, and the resulting change in the output of the transformer is detected by the level detector 8. A signal having an amplitude corresponding to the thickness of the banknote is fed by the level detector 8 to an auto-reference circuit 9. An alternative to this arrangement would be to dispense with the pivot arm 2 and to drive the LVDT core directly, e.g. by a jockey wheel.

The expected thickness of a banknote is set manually by a control 11 for a thickness control circuit 10, which sends a signal to the auto-reference circuit 9. The auto-reference circuit derives a threshold level for a single banknote, preferably by adding the expected thickness to a reference datum level provided by the level detector 8. The auto-reference circuit also derives the threshold level for a double banknote. During operation of the apparatus, the auto-reference circuit repeatedly updates these threshold level values when there is no banknote under the roller, to take into account changes in the datum level.

When one or more banknotes pass under the roller, the level detector 8 provides a thickness signal which is compared in the comparators 12 and 13 with the threshold values, which in turn provide output signals 14 and 15 according to the results of the comparisons.

The thickness control 11 can be manually adjusted by an operator, for example, when changing from feeding British banknotes to French banknotes which are notably thinner than the British notes.

Figure 2:
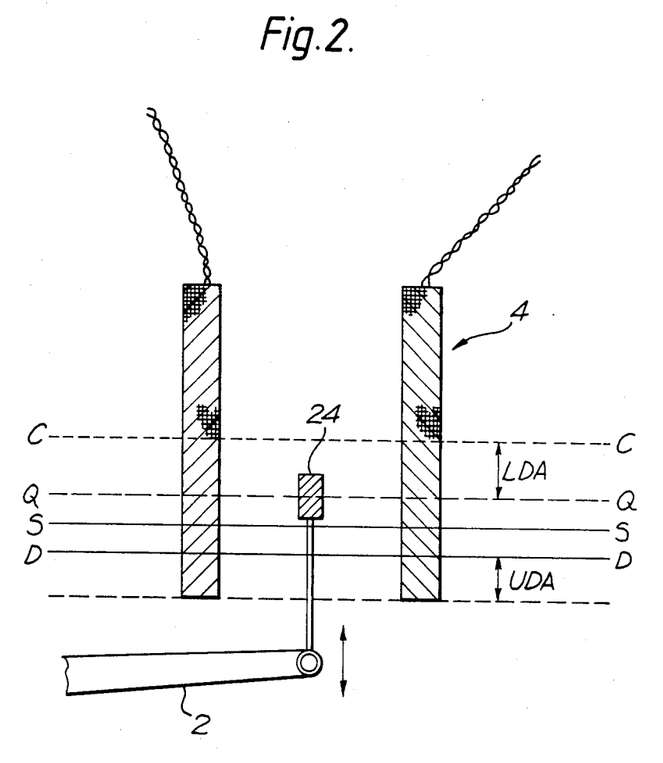
FIG. 2 shows the transducer of FIG. 1 in greater detail.

Referring to FIG. 2, the end of the pivot arm 2 which engages with the L.V.D.T. 4 is attached via a short rod to a core 24, which is free to move axially within the L.V.D.T. Movements of the roller 1 are converted by the pivot arm into larger, anti-parallel movements of the core 24, and the axial position of the core determines the magnitude of the signal provided by the L.V.D.T. to the level detector 8.

The L.V.D.T. 4 is symmetrical about a central plane C-C normal to the axis, and the upper half (in FIG. 2) is not used. With the roller 1 touching the surface 6, with no note present, the core 24 should be at a position Q-Q, a little displaced from the central plane. This is known as the quiescent start point. The L.V.D.T. provides a zero output with the core 24 at the central plane C-C, but provides signals of increasing magnitude as the core is moved away from this plane (in either direction). With a single note thickness between the roller 1 and the surface 6, the core 24 reaches a plane S-S, and with a double thickness it reaches a plane D-D. In use, atmospheric variations and general wear may cause these positions and the quiescent start point to drift in either direction, it being the purpose of the auto reference circuit to compensate for this drift. The acceptable limit of drift in one direction for the quiescent start point Q-Q is the central plane C-C; the region of drift in this direction is the lower drift area LDA. The acceptable limit of drift in the opposite direction for the double thickness plane D-D is the end of the transformer coil, beyond which there is no longer a linear relationship between the core position and the output signal; the region of drift in this opposite direction is the upper drift area UDA.

For the system to cope with the maximum range of mechanical drift, the sensor core must be positioned at the optimum quiescent start point within the sensor body when the system is fitted to a machine.

The quiescent start point can easily be set by adjusting the sensor body to give a reference voltage output from the level detector 8 to the auto reference circuit 9 of 0.5 volts d.c.

There are, however, two such positions, corresponding to reflections of the core position about the central plane C-C, or sensor zero-output point. The correct one can be found by moving the core 24 in the direction of increasing banknote thickness and checking that the voltage output also increases. With the L.V.D.T. and core correctly adjusted, the voltage output from the level detector 8 is the 0.5 volt reference value with no note present, and, for example, 0.8 volt with a single note and 1.1 volts with a double note. These values will be referred to as TP3, TP1 and TP2 respectively. A convenient way of adjusting the L.V.D.T. to give an output of 0.5 volt with no note present is by means of a voltage monitoring circuit, as shown at the bottom of FIG. 3B. The voltage signal TP3 is fed into the monitoring circuit, which lights either a red light-emitting diode LED1 or a green one LED 2 depending on whether the voltage TP3 is outside or inside acceptable voltage tolerances around the nominal 0.5 volt level. A voltage divider network of resistors RR1 (e.g. 5.K6), RR2 (e.g. 220Ω) and RR3 (e.g. 560Ω) connected between the reference 5 volt level and ground provides a voltage slightly above 0.5 to a first comparator CC1, and a voltage slightly below 0.5. volt to a second comparator CC2. The signal TP3 is fed to the other input terminal of each comparator, and the outputs of the comparators are added to produce a signal which is at one level if the signal TP3 is close to 0.5 volt, and another level if it is outside this tolerance. This signal is fed to a pair of series-connected pnp and npn transistors, so connected that either LED1 or LED2 energizes depending on the signal value. The L.V.D.T. core is moved relative to the transformer until the green light LED2 comes on.

Figure 3A:
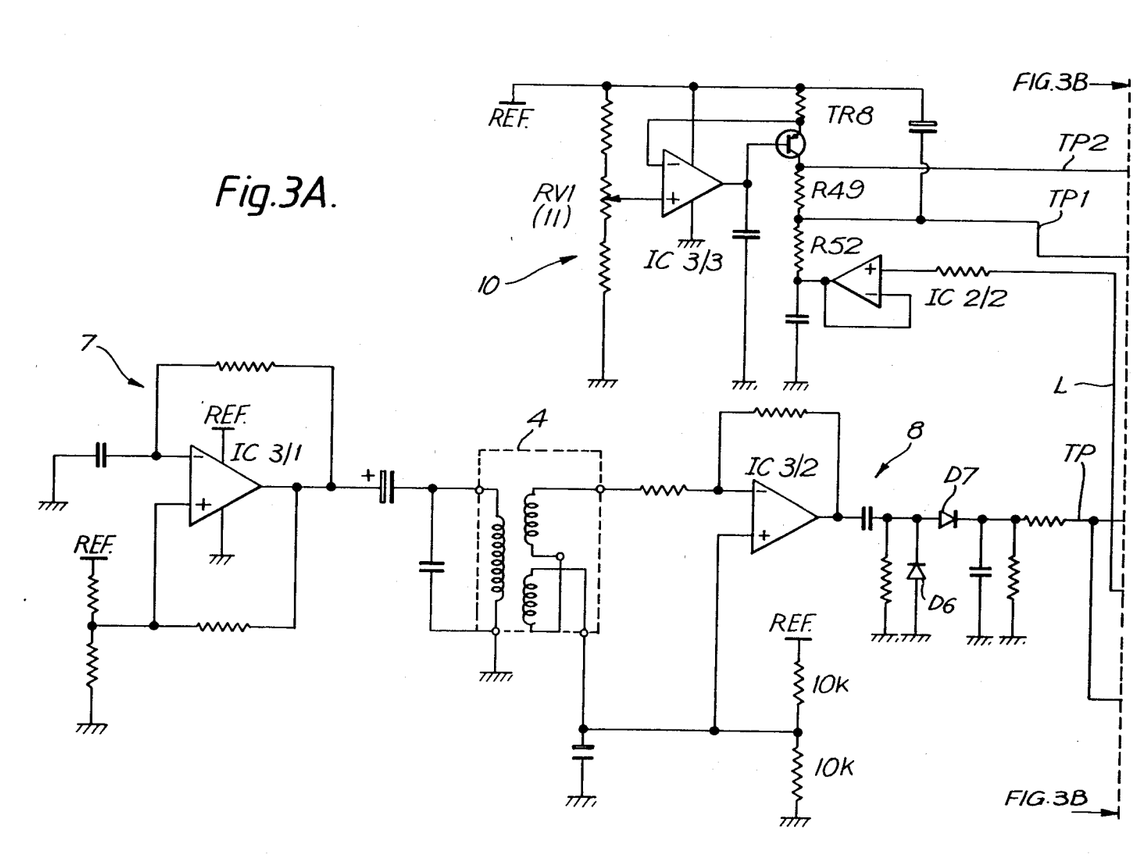
FIGS. 3A and 3B, which are halves of the same circuit diagram, show the control circuit in greater detail.
Figure 3B:
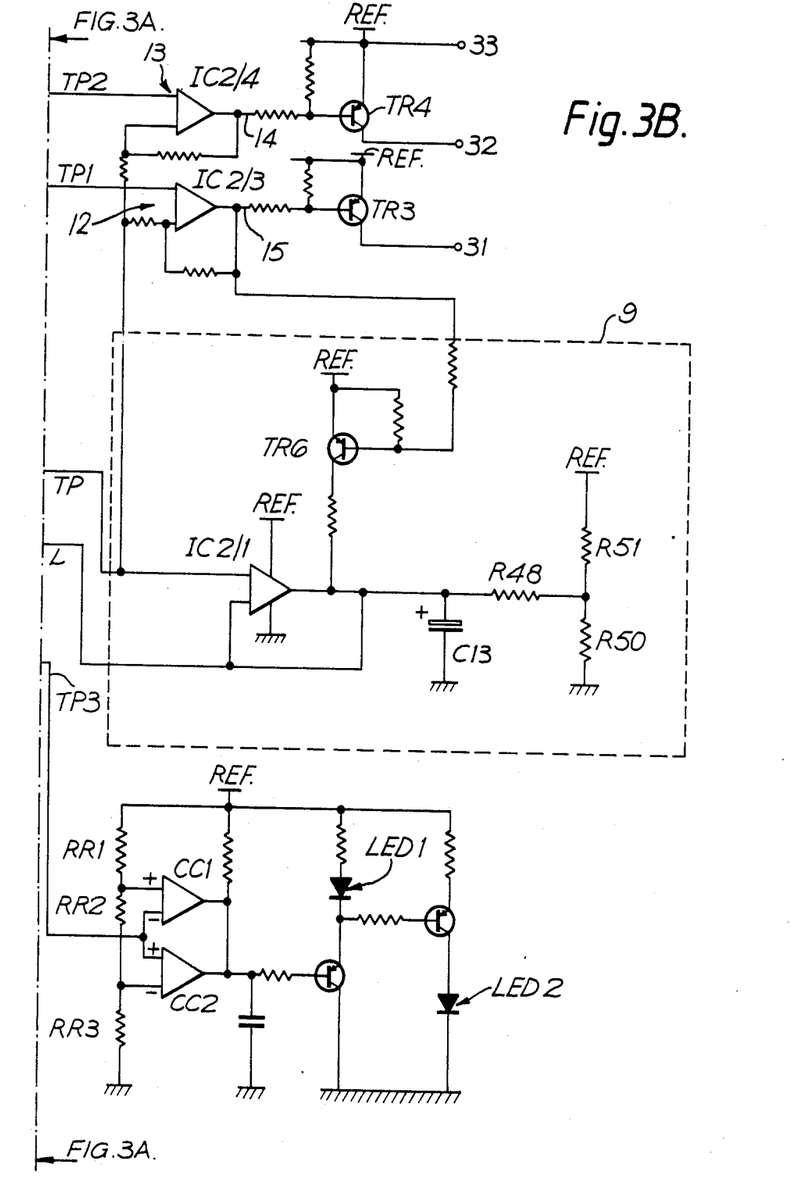

FIGS. 3A and 3B are two halves of the circuit diagram of this preferred embodiment of the invention.

The L.V.D.T.4 is driven by a primary drive oscillator IC3/1 which runs at about 10 kHz. The whole oscillator circuit 7 supplies an output through an electrolytic capacitor to the drive coil of the L.V.D.T.4. (Throughout FIGS. 3A and 3B, the symbol "REF" indicates a connection to a reference voltage source of 0.5 volts, being the same level as the output TP3 for no note present under the roller 1.) The L.V.D.T. sensor output is amplified about fives times by amplifier IC3/2, and reaches diode D7 via a high pass filter, which allows only the carrier content of the signal to pass through. Diode D6 provides D.C. restoration to gain full advantage of the envelope.

Figure 4:
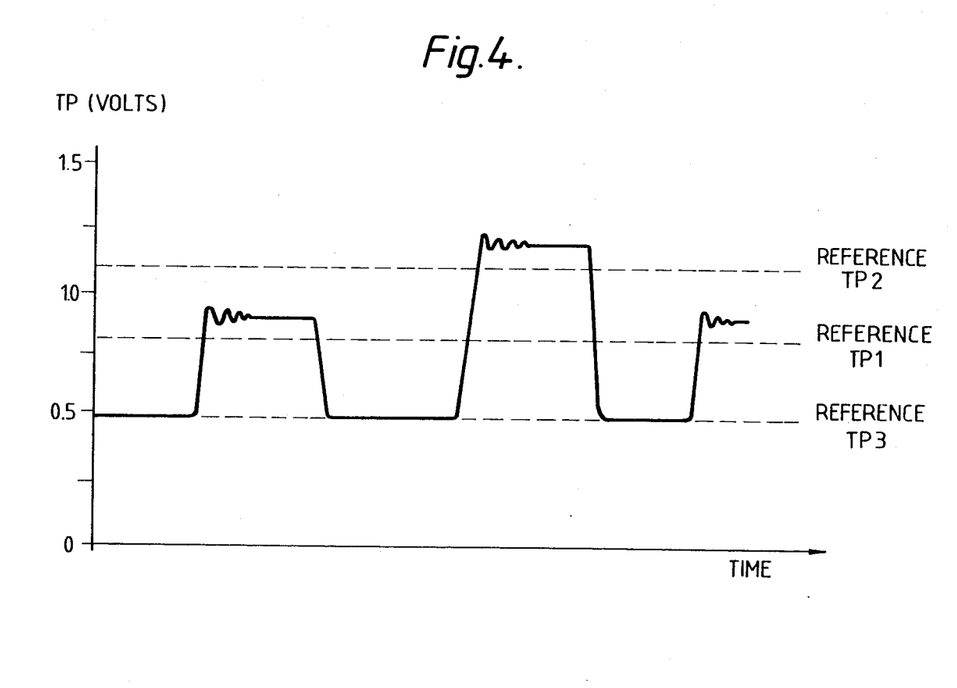
FIG. 4 is a waveform diagram for signal TP3 of FIG. 3.

The signal emerging from diode D7 is labelled TP and is of the form shown in FIG. 4. This waveform has a first peak corresponding to a single note, a second peak for a double note, and third peak similar to the first for another single note. The lowest level of signal TP is nominally at 0.5 volt, the reference level for TP3. The single- and double-note peaks exceed their respective thresholds TP1 and TP2.

The output signal TP from the level detector 8 is fed to the auto reference circuit 9, which is connected to circuitry 12, 13 for determining the presence of a single or a double note. Signal TP is fed to an amplifier IC2/1 whose output normally follows the TP signal. When a note appears, a transistor TR6 connected between the output of IC2/1 and the reference level, is switched off by a single note comparator 12 (IC2/3) connected to the base of transistor TR6. This prevents the output of IC2/1 from following the level of the output signal TP while a note is present.

The output level of IC2/1 is maintained by an electrolytic capacitor C13, connected between the output of IC2/1 and ground. This level is maintained by the capacitor C13 until the note has passed. A resistor network consisting of resistors R48, R50 and R51 ensures that the capacitor C13 always attempts to charge towards the optimum quiescent point to prevent any possible locking out of the system. The output level from the amplifier IC2/1 is also conveyed along line L to an input of another amplifier IC2/2, shown in the upper half of FIG. 3A. This part of the circuit is responsible for obtaining reference levels TP1 and TP2 from the reference defined by the potential stored in capacitor C13. The reference levels for single and double notes are derived from the reference level for when no note is present. The purpose of this part of the circuit is to maintain the differences between the reference levels TP1, TP2 and TP3 despite any variations in the reference level TP3, the differences being determined by a thickness control circuit 10 comprising a variable resistor RV1. An amplifier IC3/3 and a transistor TR8 are connected between the reference potential and ground so as to constitute a constant current source. The current output of this constant current source is determined by the value of the variable resistor RV1 (11), in accordance with the desired threshold thickness level. Reference resistors R49 and R52 are connected in series between the collector of transistor TR8 and the output of the amplifier IC2/2. The reference resistors R52 and R49 are fed by the constant current source TR8, IC3/3 and the resistors together with the constant current source form a transconductance amplifier. The current passing through the reference resistors sets up the two reference thresholds TP1 and TP2 for single note and double note respectively. The reference voltages are fixed above the output of amplifier IC2/2 which is effectively the TP3 "no note" level. Any change in the reference level or no note, TP3, therefore causes the reference levels TP1 and TP2 to change by the same amount, thus retaining the reference differentials. The references for single and double thicknesses of notes are therefore always made with reference to the current quiescent displacement of the core of the L.V.D.T. sensor 4.

The reference voltage TP1 and TP2 are conveyed to difference amplifiers IC2/3 and IC2/4 respectively, as shown in FIG. 3B. Amplifiers IC2/3 and IC2/4 together with their respective feedback resistors constitute output comparators for single and double notes respectively, designated 12 and 13 in FIG. 1. The other input to the comparators in each case is the current value of the output TP from the level detector 8. The outputs 15, 14 of the output/comparators 12, 13 are fed to transistors TR3 and TR4, the emitter of each transistor being connected to the reference potential. Transistors TR3 and TR4 are normally-saturated switches. Transistor TR3 turns off when a single note is present, and TR4 turns off when a double note is present. These transistors provide outputs at points 31, 32 and 33 to further circuitry (not shown) which may respond to the presence or absence of single or double notes.

In the circuit shown in FIG. 3A, reference resistors R49 and R52 need not have the same value, thus allowing the differentials between the threshold potential values to be different. The difference between TP2 and TP3 need not be exactly double that between TP1 and TP3.

The control circuit described above responds to the presence of single or double banknote thicknesses, but could be extended to respond to multiple banknote thicknesses, or to the thicknesses of different types of banknotes. The detector could for example discriminate between a thick note and a thin note and/or between double thickness of each type of note.

Figure 5:
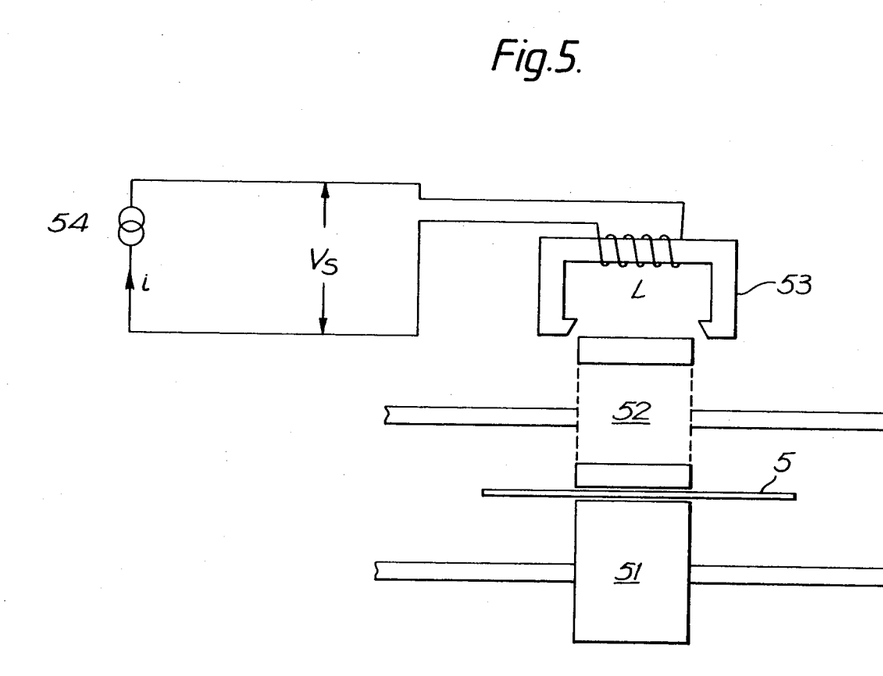
FIG. 5 illustrates apparatus according to a second embodiment of the invention.

Apparatus according to a second embodiment of the invention is shown in FIG. 5, which includes nip rollers and a variable reluctance transducer of the type discloed in British Pat. No. 1497181. The banknote 5 is fed into the nip of rollers 51 and 52. Roller 51 has an axle which is not free to move vertically, but follower roller 52 is free to move vertically in accordance with the thickness of the banknote. The follower roller is a rubber flexing roller which is eccentrically deformable and has a steel tyre which moves in the mouth of the magnetic core of a transducer transformer 53, causing the transducer reluctance to vary in accordance with the gap between the core and the tyre. A measurement of the reluctance therefore reveals the thickness of the banknote.

A coil L in the transformer is supplied with a current i from a current source 54, at a voltage Vs which constitutes the a.c. thickness signal provided to the level detector 8 of FIG. 1. The voltage Vs is proportional to $LI.2\pi f$, where $L=N^2/Rm$, L being the inductance of the coil, N being the number of turns, Rm being the reluctance; I being the amplitude and f being the frequency of the a.c. current $i=I \sin (2\pi ft)$.

This system offers the best possible maintenance-free operation since there are no mechanical linkages, and it is unaffected by dust. Also, because the signal is compatible with the control circuit above, mechanical tolerances and long term drift such as wear or thermal expansion etc. are coped with.

I claim:

1. Apparatus for detecting the passage of single and multiple sheets (5) along a flow path, comprising: a surface (6) in the flow path for supporting the sheet or sheets; a follower (1 or 52) biased such that it normally abuts against the supporting surface and follows the profile of the supporting surface and the overlying sheet or sheets; a transducer (4 or 53) responsive to the position of the follower to provide a thickness signal (TP) indicative of the linear displacement of the follower relative to the supporting surface due to the passage of the sheet or sheets; a control circuit (FIGS. 3A, 3B) which compares the thickness signal (TP) with at least one stored threshold level signal to provide an output signal (31, 32, 33) indicative of whether the detected thickness corresponds to that of a single sheet or multiple sheets; the control circuit including: means (9) responsive to the transducer output signal in the absence of a sheet for repeatedly updating a stored no-sheet signal level; adjustable threshold level generating means (10) including adjustable means for generating first and second signals (TP1, TP2) which correspond to changes in the output of the transducer in response to the passage of a single sheet and two superimposed sheets, respectively; and means connecting the first and second signal generating means to the output of the updating means to add the updated no-sheet signal level to the first and second signals to obtain updated first and second threshold levels which will be exceeded by the output of the transducer in response to the passage of a single sheet and two superimposed sheets, respectively.

2. Apparatus in accordance with claim 1, wherein the means for generating the first and second signals comprises a manually adjustable variable resistor (RV1), a constant current source (IC3/3, TR8) whose output is determined by the variable resistor, and first (R52) and second (R49) reference resistors connected in series between the output of the constant current source and the output of the updating means.

3. Apparatus in accordance with claim 1, wherein the follower is attached to one end of an arm (2), and the transducer engages with the other end of the arm.

4. Apparatus in accordance with claim 3, wherein the arm is an elongate arm pivoted at a point (3) along its length for conveying the movement of the follower to the transducer.

5. Apparatus in accordance with claim 4, wherein the position of the pivot point along the arm is such that small displacements of the follower are converted into larger displacements of the other end of the arm engaging with the transducer.

6. Apparatus in accordance with claims 3, 4 or 5, wherein the follower is a cylindrical roller whose axle is attached to one end of the arm.

7. Apparatus in accordance with claim 1, wherein the transducer is a linear variable differential transformer.

8. Apparatus in accordance with claim 1 wherein the follower (52, FIG. 5) is a cylindrical roller, the transducer (53, FIG. 5) being of variable reluctance and comprising a transformer whose magnetic circuit is completed by a portion of the periphery of the follower (52), the thickness signal being the voltage (Vs) across the transformer which depends on the degree of displacement of the follower roller towards a core of the transformer.

9. Apparatus in accordance with claim 8, wherein the supporting surface for the sheet or sheets is a second roller (51), which together with the follower constitutes a nip for the sheet or sheets.

10. Apparatus in accordance with claims 8 or 9, wherein the follower is a steel-surfaced, rubbercored roller.

* * * * *